United States Patent [19]

Morisawa et al.

[11] Patent Number: 5,475,762
[45] Date of Patent: Dec. 12, 1995

[54] COMPUTER WITH PASSWORD PROCESSING FUNCTION AND PASSWORD PROCESSING METHOD OF COMPUTER

[75] Inventors: Toshikazu Morisawa, Tokorozawa; Koichi Dewa, Ome; Toshimitsu Saito, Fuchu, all of Japan

[73] Assignee: Kabushiki Kaisha Toshiba, Kawasaki, Japan

[21] Appl. No.: 218,296

[22] Filed: Mar. 28, 1994

Related U.S. Application Data

[63] Continuation of Ser. No. 950,504, Sep. 25, 1992, abandoned.

[30] Foreign Application Priority Data

Oct. 11, 1991 [JP] Japan ................................ 3-263874

[51] Int. Cl.⁶ .............................. H04L 9/32; G06F 13/14
[52] U.S. Cl. .................................. 380/25; 380/4; 380/23; 380/49; 380/50; 340/825.31; 340/825.34; 395/114; 395/427; 395/728
[58] Field of Search .............................. 380/3, 4, 23, 24, 380/25, 49, 250; 340/825.31, 825.34; 395/114, 425, 725

[56] References Cited

U.S. PATENT DOCUMENTS

| | | | |
|---|---|---|---|
| 3,890,601 | 6/1975 | Pietrolewicz et al. | 395/425 |
| 4,234,920 | 11/1980 | Van Ness et al. | 395/575 |
| 4,414,664 | 11/1983 | Greenwood | 371/37.3 |
| 4,458,315 | 7/1984 | Uchenick | 380/4 |
| 4,590,552 | 5/1986 | Guttag et al. | 395/425 |
| 4,648,031 | 3/1987 | Jenner | 395/575 |
| 4,654,792 | 3/1987 | Thomas | 395/275 |
| 4,661,991 | 4/1987 | Logemann | 340/825.31 X |
| 4,674,038 | 6/1987 | Brelsford et al. | 395/575 |
| 4,752,068 | 6/1988 | Endo | 273/434 |
| 4,907,150 | 3/1990 | Arroyo et al. | 395/575 |
| 5,001,554 | 3/1991 | Johnson et al. | 358/86 |
| 5,222,231 | 6/1993 | Gunji | 395/575 |

FOREIGN PATENT DOCUMENTS

| | | | |
|---|---|---|---|
| 0230351 | 7/1987 | European Pat. Off. | |
| 4008971 | 9/1991 | Germany | G06F 12/14 |
| 2287835 | 11/1990 | Japan | G06F 11/00 |

OTHER PUBLICATIONS

Reference Manual, Toshiba T4400SX Portable Personal Computer, 6 pages.
Reference Manual, Toshiba T6400 Series Portable Personal Computer, 9 pages.
Reference Manual, Toshiba T3300SL Notebook Computer, 11 pages.
User's Guide, COMPAQ Contura Family of Personal Computers, First Edition, Jun. 1992, Part No. 141989-001, pp. 3-17-3-24.
Manual of the Automated Patent System, Mar. 8, 1990.
IBM Technical Disclosure Bulletin, vol. 30, No. 5, Oct. 1987, pp. 57-58, "Security System for Personal Computers".

*Primary Examiner*—Bernarr E. Gregory
*Attorney, Agent, or Firm*—Oblon, Spivak, McClelland, Maier, & Neustadt

[57] ABSTRACT

A computer has a conversion module for converting a password to be registered into a compressed-bit row in accordance with a predetermined rule. A registration module stores the compressed bit row of the registered password in a backup RAM. A conversion module converts a password to be compared with the registered password into a compressed bit row. A comparison module compares the compressed bit row of the compared password with the compressed bit row of the registered password. Upon detecting a coincidence between the two compressed bit rows, a system activation module is activated to set the system to a access allowable state.

16 Claims, 6 Drawing Sheets

COMPUTER WITH PASSWORD PROCESSING FUNCTION AND PASSWORD PROCESSING METHOD OF COMPUTER

This application is a continuation of application Ser. No. 07/950,504, filed on Sep. 25, 1992.

BACKGROUND OF THE INVENTION

1. Field of the Invention

The present invention relates to a computer with a security function by using a password, and a password processing method of a computer.

2. Description of the Related Art

Heretofore, many computers have a security function by a password check. Namely, a standard password, which is set by a user himself, is previously stored in, for example, a backup RAM. Thereafter, only when a password, which is inputted, coincides with the stored standard password, activation of the system is allowed.

However, computers with such a security function have the following problems. The backup RAM for storing passwords in many computers has strict limitations in a storage area of standard passwords, e.g., because consumed electric power is lowered. Thus, the length of a password to be set is limited.

Further, a password inputted by a user is stored in a backup RAM for storing passwords without processing the password as it is. Thus, illegal password analysis is relatively easily conducted.

If a user forgets the password set by the user, or if someone must use the computer urgently when the user is absent, there is no method for promptly overcoming such problems.

Particularly, in the case where a user forgets his password, it is necessary that a cabinet of the computer is opened and a battery which is mounted in the backup RAM is removed to delete the contents within the backup RAM. Thus, the user is required very troublesome work.

SUMMARY OF THE INVENTION

A first object of the present invention is to provide a computer where limitation in the length of a password is reduced and illegal analysis of a password is prevented.

A second object of the present invention is to provide a computer where even if a user forgets his password, assistance therefor is easily given.

To accomplish the first object, a computer with a password processing function according to the first aspect of the present invention comprises an input means for inputting a first password and a second password. A first conversion means converts the first password inputted from the input means into a first compressed bit row in accordance with a predetermined rule. A storage means stores the first compressed bit row converted by the first conversion means. A second conversion means converts the second password inputted from the input means into a second compressed bit row in accordance with the same rule of the first conversion means. A comparison means compares the second compressed bit row converted by the second conversion means with the first compressed bit row stored in the storage means and a setting means sets, when as a result of the comparison by the comparison means the second compressed bit row coincides with the first compressed bit row, the computer to an access allowable state.

To accomplish the second object, a computer with a password processing function according to the second aspect of the present invention comprises an input means for inputting a first password, a second password and a third password and means for incorporating an application program stored in an outer storage means outside the computer for registering the first password into the computer. A first registration means registers the first password inputted from the input means as a first registration password in accordance with the incorporated application program. A second registration means registers the second password inputted from the input means as a second registration password in accordance with a program originally stored in the computer. A storage means stores the registered first registration password and the registered second registration password. A comparison means compares the third password inputted from the input means with the first registration password and the second registration password stored in the storage means and a setting means sets, when as a result of the comparison by the comparison means the third password coincides with one of the first registration password and the second registration password, the computer to an access allowable state.

Thus, according to a computer of this first invention, limitation in the length of a password can become reduced and illegal analysis of a password can be prevented.

Moreover, according to a computer of this second invention, even if a user forgets his password, assistance therefor is easily given.

DETAILED DESCRIPTION OF THE PREFERRED EMBODIMENTS

Embodiments of the present invention will now be described.

Figure 1:
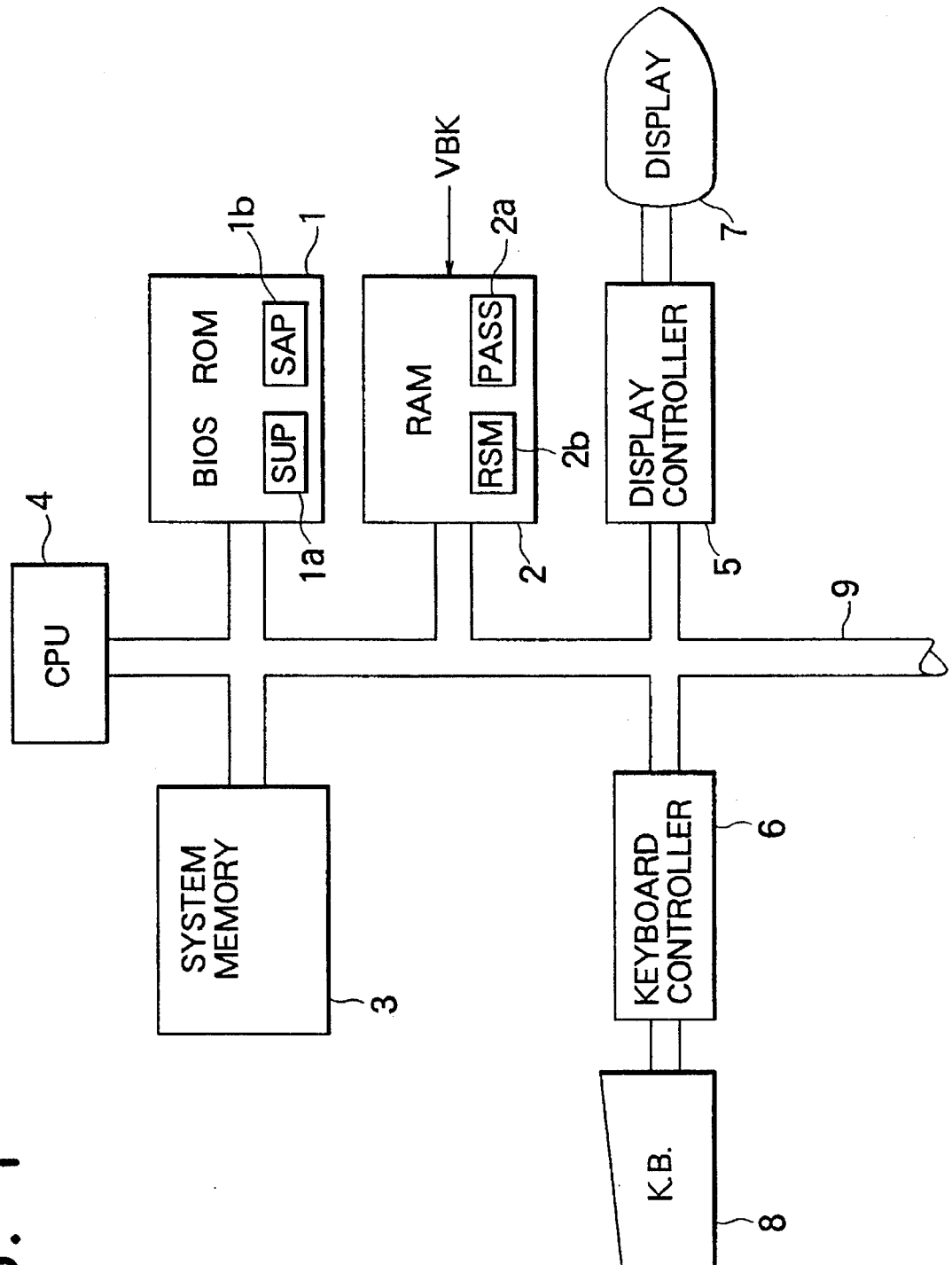
FIG. 1 is a block diagram showing the structure of a computer according to an embodiment of the present invention.

FIG. 1 is a block diagram showing the structure of a computer with a password processing function according to an embodiment of the present invention.

Referring to FIG. 1, the computer comprises a BIOS ROM (Basic Input Output System Read Only Memory) 1; a backup RAM 2; a system memory (main memory) 3; a CPU (Central Processing Unit) 4; a display controller 5; a keyboard controller 6; a display 7; a keyboard 8; and a system bus 9.

The BIOS ROM 1 stores a setup program 1a, a system activation program 1b and the like.

The backup RAM 2 comprises a volatile memory supplied with a backup power VBK or an EEPROM. The backup RAM 2 saves the contents of the system memory 3 and registers in the CPU 4, when a main power is turned off while the BIOS is enabled. The backup RAM 2 includes a password area 2a for storing a password and a password flag, and a resume flag area 2b for storing a resume flag.

The system memory 3 stores various programs and data for data processing to be executed by the CPU 4. The system memory 3 is also used as a data area for the BIOS ROM 1.

The CPU 4 totally controls the whole computer. The CPU 4 executes data processing in accordance with the programs stored in the system memory 3.

The display controller 5 controls the display operation of the display 7. The display 7 comprises, e.g., a liquid crystal display, a plasma display, a CRT, or the like.

The keyboard controller 6 detects an operation of a key at the keyboard 8, and informs the content of the key operation to the CPU 4.

Figure 2:
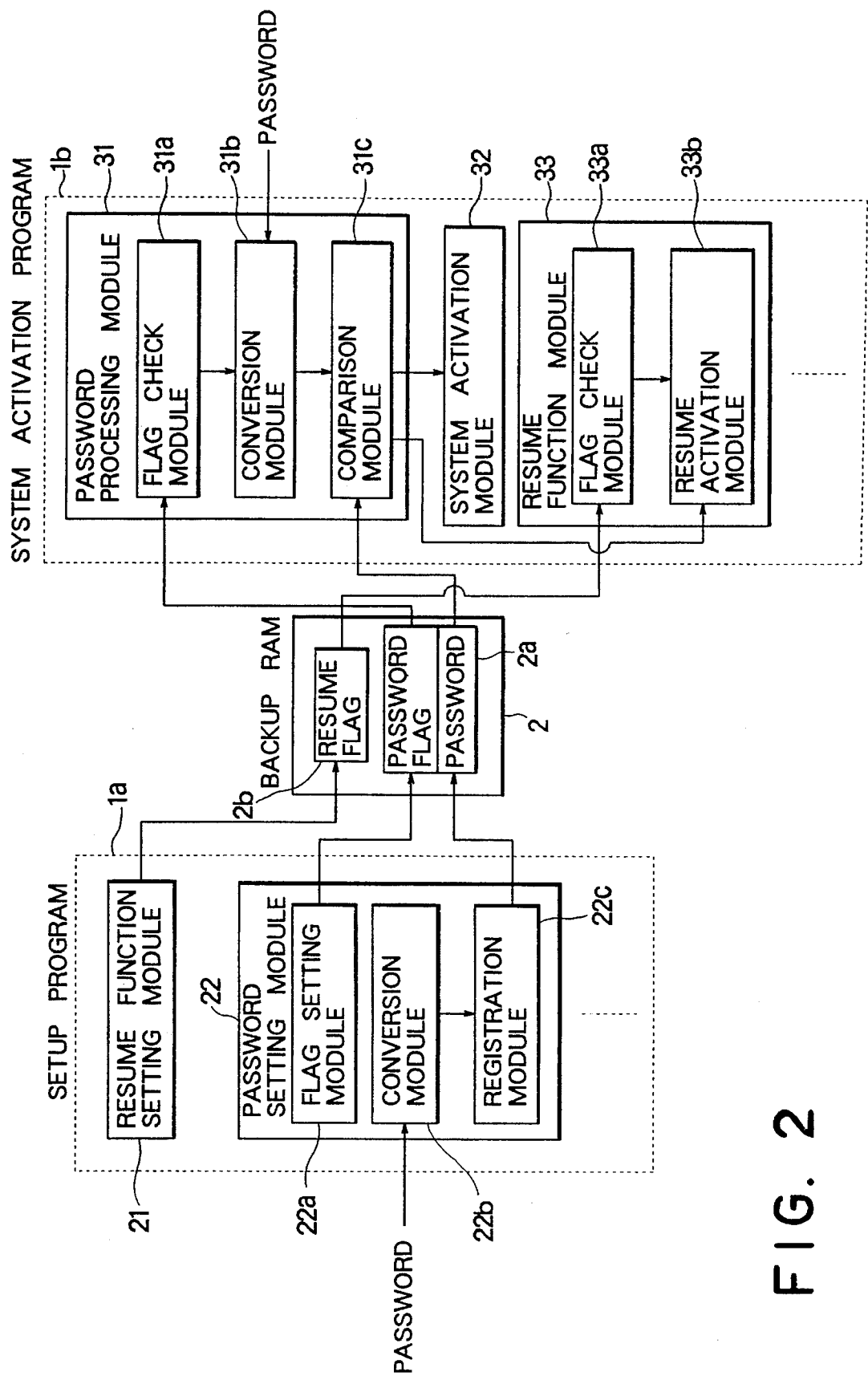
FIG. 2 is a view showing the structures of a system activation program and a setup program stored in a BIOS ROM shown in FIG. 1.

The setup program 1a stored in the BIOS ROM 1 includes, as shown in FIG. 2, a resume function setting module 21, a password setting module 22 and the like.

The resume function setting module 21 sets whether or not a resume function is to be enabled. The resume function setting module 21 sets or resets a resume flag for the resume flag area 2b in the backup RAM 2 in accordance with an ON/OFF state of setting the resume function.

The password setting module 22 comprises a flag setting module 22a, a conversion module 22b, and a registration module 22c. The flag setting module 22a sets whether or not a password is to be set. The flag setting module 22a sets or resets a password flag for the password area 2a in the backup RAM 2 in accordance with an ON/OFF state of setting a password. The conversion module 22b converts an inputted password into a compressed bit row in accordance with a predetermined rule. The registration module 22c registers the password, which is converted into the compressed bit row, in the password area 2a of the backup RAM 2 as a registered password.

On the other hand, the system activation program 1b stored in the BIOS ROM 1 includes, as shown in FIG. 2, a password processing module 31, a system activation module 32 and a resume function module 33.

The resume function is a function where if the main power is turned off while the BIOS is enabled, the contents of registers in the CPU 4 and the system memory 3 are saved in the backup RAM 2; and then if the main power is turned on, the contents of the backup RAM 2 are restored to their original locations.

The password processing module 31 includes a flag check module 31a, a conversion module 31b, and comparison module 31c. The flag check module 31a checks a password flag stored in the password area 2a of the backup RAM 2. The conversion module 31b converts an inputted password into a compressed bit row in accordance with the same rule as that of the conversion module 22b. The comparison module 31c compares the compressed bit row, which are converted from the password, with the compressed bit row of the registered password, which are registered in the password area 2a of the backup RAM 2. As a result, the module 31c judges a coincidence or noncoincidence therebetween.

The system activation module 32 sets the system to the state where access can be allowed, when the comparison module 31c detects a coincidence between the compressed bit rows of the two passwords.

The resume function module 33 includes a flag check module 33a, and a resume activation module 33b. The flag check module 33a checks a resume flag stored in the resume flag area 2a of the backup RAM 2. When the resume function is enabled, if the comparison module 31c detects that the compressed bit row of an inputted password coincides with those of a registered password respectively, the resume activation module 33b activates the resume function to restore the state of data processing immediately before the main power is turned off.

Figure 3:
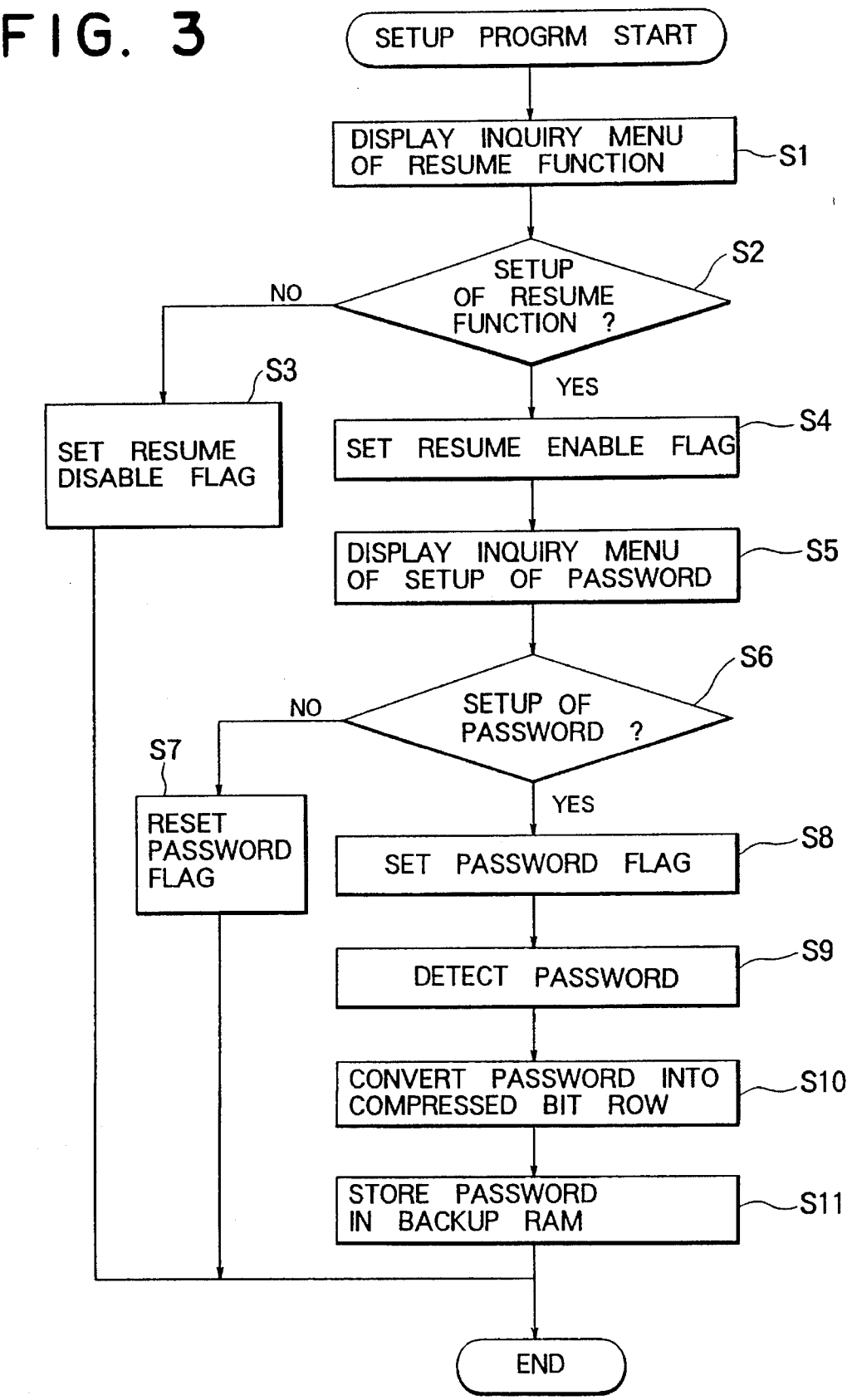
FIG. 3 is a flow chart showing an operation at setup of the computer shown in FIG. 1.
Figure 4:
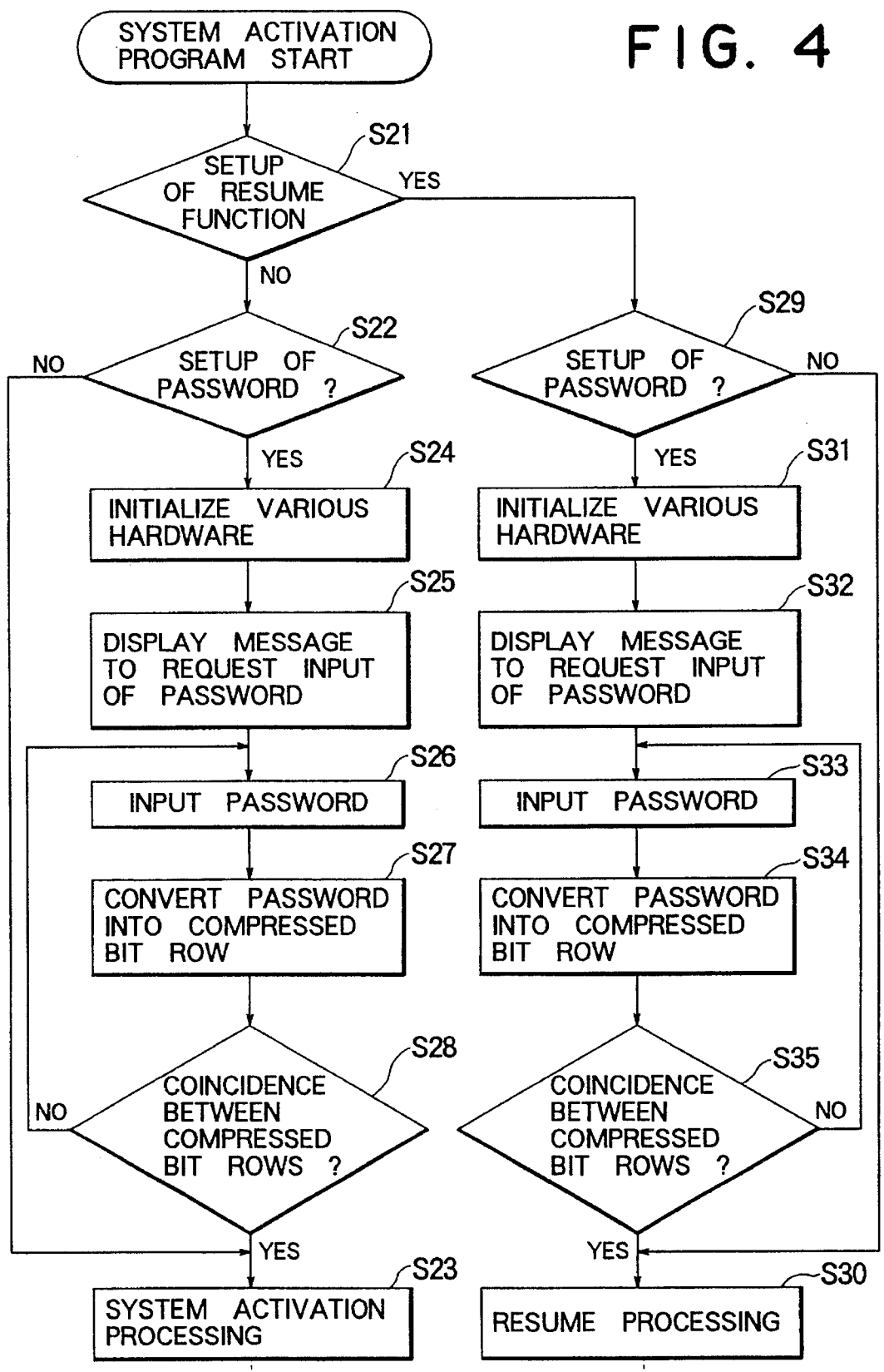
FIG. 4 is a flow chart showing an operation at system activation of the computer shown in FIG. 1.

Next, operations of the computer will now be described below referring to FIGS. 3 and 4.

First, referring to FIG. 3, an operation of setup will be described.

After the main power is turned on, a user depresses a predetermined key on the keyboard 8 to start the setup program 1a. The keyboard controller 6 detects the key operation, and supplies a signal of this key operation to the CPU 4.

In response to the signal, the CPU 4 starts the setup program 1a.

The CPU 4 displays a menu for inquiring a user whether or not the resume function is to be enabled on the display 7 in accordance with the resume function setting module 21 in the setup program 1a (step S1).

In response to this inquiry, a user inputs an answer indicating whether the resume function is to be enabled or disabled at the keyboard 7. The input content is checked in step S2.

If the input contents indicates that the resume function is to be disabled, the CPU 4 sets a resume flag indicating OFF of the resume function (resume disable flag) in the resume flag area 2b of the backup RAM 2 (step S3). Thereafter, the flow advances to other processing.

If the input content indicates that the resume function is to be enabled, the CPU 4 sets a resume flag indicating ON of the resume function (resume enable flag) in the resume flag area 2b of the backup RAM 2 (step S4).

Then the CPU 4 displays a menu for inquiring a user whether or not a password is to be set on the display 7 (step S5).

In response to this inquiry, a user inputs an answer indicating whether or not a password is to be set at the keyboard 7. The input content is checked in step S6.

If the input content does not indicate that a password is to be set, the CPU 4 sets a password flag indicating this in the password area 2a of the backup RAM 2 (step S7). Thereafter, the flow advances to other processing.

If the input content indicates that a password is to be set, the CPU 4 sets a password flag indicating this in the password area 2a of the backup RAM 2 (step S8).

When setup of a password is selected, a user inputs a password from the keyboard 8. The CPU 4 causes the display 7 to display the input password. When the user recognizes that the displayed password is correct, the user depresses an enter key. In response to this, the password is determined (step S9).

Upon determination of the password, the CPU 4 converts the password into a compressed bit row in accordance with the conversion module 22b in the password setting module 22 as follows (step S10).

That is, the CPU 4 treats the password as a binary number bit row. The binary number bit row is divided by a polynomial such as $X^{16}+X^{12}+X^5$, to obtain the quotient of the division as a conversion result (compressed bit rows). The compressed bit row obtained by using this rule has a fixed length (16 bits) independently of the length of the original password.

Then, the compressed bit row of the password is stored in the password area 2a of the backup RAM 2 (step S11).

Next, referring to FIG. 4, an operation, where a user activates the computer for executing normal data processing, will be described below.

If the main power is turned on, the CPU 4 checks the resume flag held in the resume flag area 2b of the backup RAM 2 in accordance with the flag check module 33a in the system activation program 1b to judge whether or not the resume function is enabled (step S21).

An operation upon detecting that the resume function is disabled will be described below.

If the check of the resume flag is completed, the password processing module 31 is activated. The CPU 4 checks the password flag stored in the password area 2a of the backup RAM 2 in accordance with the flag check module 31a in the password processing module 31 to judge whether or not a password is set (step S22).

If it is detected that a password is not set, the CPU 4 activates the system activation module 32 to set the system to an access allowable state (step S23).

If it is detected that a password is set, the CPU 4 initializes various hardware necessary for password processing (step S24). Thereafter, a message requesting a user to input a password is displayed on the display 7 (step S25).

In response to this message, the user inputs a password from the keyboard 7. If a password is inputted (step S26), the CPU 4 converts the inputted password into a compressed bit row in accordance with the conversion module 31b in the password processing module 31. The conversion is executed by using the same rule as that of the above conversion module 22b in the password setting module 22 (step S27).

Then, the CPU 4 reads a compressed bit row of a registered password stored in the password area 2a of the backup RAM 2 in accordance with the comparison module 31c. The CPU 4 compares the compressed bit row of the registered password with that of the inputted password (step S28).

As a result of the comparison, if a coincidence is not found between the compressed bit rows of the two passwords, the CPU 4 judges that the inputted password is invalid. The flow returns to the state of waiting for input of a password before step S26.

If a coincidence is not found between the compressed bit rows of the two passwords, the CPU 4 activates the system activation module 32 to set the system to an access allowable state (step S23). Thereafter, the flow advances to normal data processing.

Next, an operation upon detecting that the resume function is enabled at the flag check of step S21 will be described below.

If the check of the resume flag is completed, the password processing module 31 is activated. The CPU 4 checks the password flag stored in the password area 2a of the backup RAM 2 in accordance with the flag check module 31a in the password processing module 31 to judge whether or not a password is set (step S29).

If it is detected that a password is not set, the CPU 4 activates the resume activation module 33b in the resume function module 33 to restore a state of data processing immediately before the main power is turned off (step S30).

If it is detected that a password is set, the CPU 4 initializes various hardware necessary for the password processing (step S31). Thereafter, a message requesting a user to input a password is displayed on the display 7 (step S32).

If in response to this message the user inputs a password (step S33), the CPU 4 converts the inputted password into a compressed bit row in accordance with the conversion module 31b in the password processing module 31. The conversion is executed by using the same rule as that of the conversion module 22b in the password setting module 22 (step S34).

Then, the CPU 4 reads a compressed bit row of a registered password stored in the password area 2a of the backup RAM 2 in accordance with the comparison module 31c. The CPU 4 compares the compressed bit row of the registered password with that of the inputted password (step S35).

As a result of the comparison, if a coincidence is not found between the compressed bit rows of the two passwords, the CPU 4 judges that the inputted password is invalid. The flow returns to the state of waiting for input of a password before step S33.

If a coincidence is found between the compressed bit rows of the two passwords, the CPU 4 activates the resume activation module 33b in the resume function module 33 to restore a state of data processing immediately before the main power is turned off (step S30).

Accordingly, the computer has the following advantageous effects. After a password is converted into a compressed bit row of a fixed length, comparison is conducted. Thus, the limitation in the length of a password can be removed and illegal analysis of a password can be prevented. Further, security using the resume function is improved.

As another method for converting a password into a compressed bit row, for example, there is a method where all of individual letters code constituting an inputted password are added and the sum of this addition becomes a conversion result. For example, if a code row "AAAA" is inputted, $41_{(16)}$, $41_{(16)}$, $41_{(16)}$, and $41_{(16)}$ make $104_{(16)}$, $[41_{(16)}+41_{(16)}+41_{(16)}+41_{(16)}=104_{(16)}]$, and a bit row by which $104_{(16)}$ is expressed in binary system is obtained as a compressed bit row of the password.

Next, another embodiment of this invention will be described referring to FIGS. 5 and 6.

The hardware structure of this embodiment is not described since the structure is the same as that shown in FIG. 1.

Figure 5:
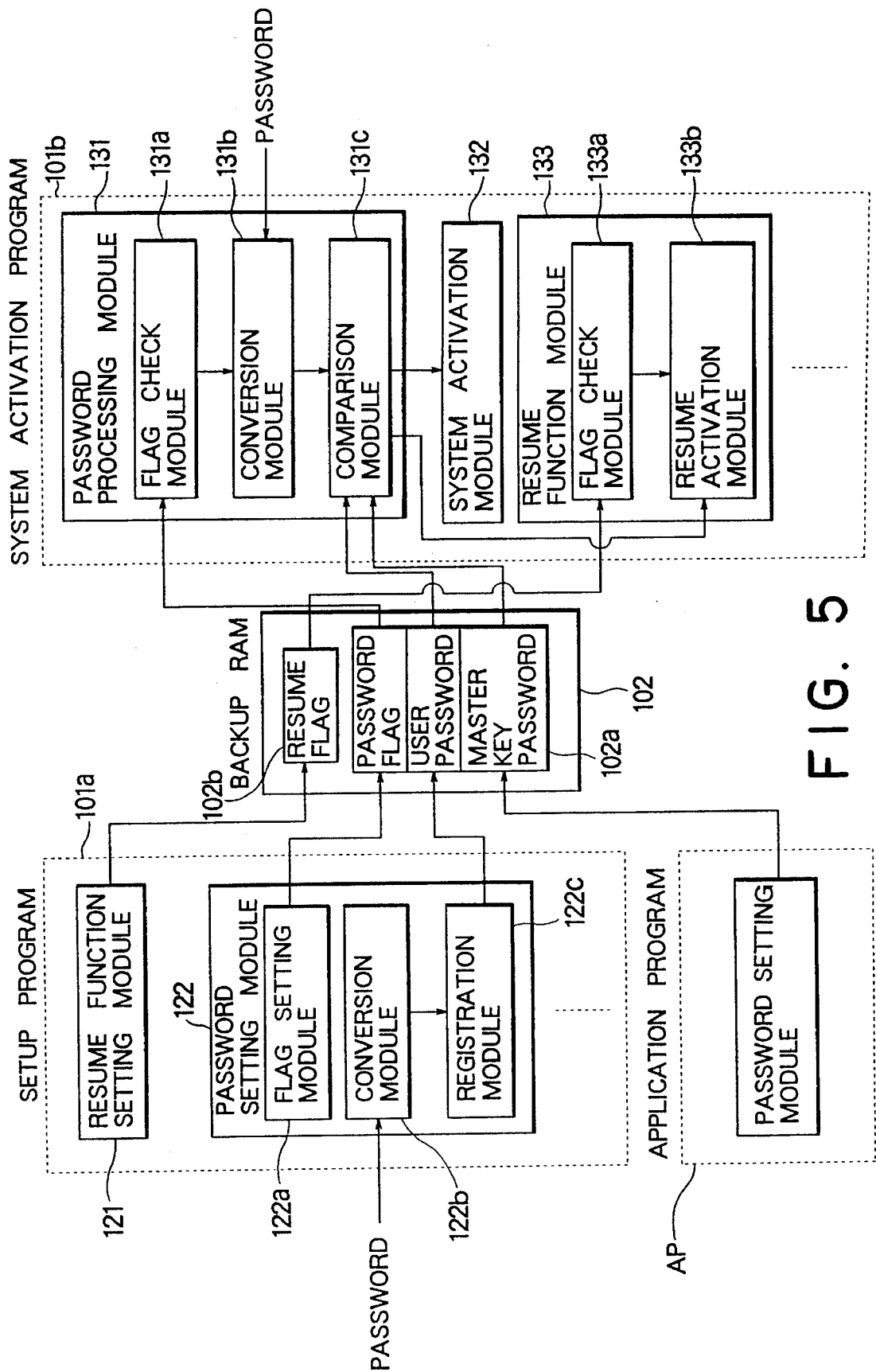
FIG. 5 is a block diagram showing the structure of a computer according to another embodiment of the present invention.

Referring to FIG. 5, this computer is characterized by the fact that two kinds of passwords are stored in a password area 102a of a backup RAM 102 and these passwords are equally treated at password collation.

One of the two passwords (hereinafter referred to as a user password) is properly set by a user in accordance with a password setting module 122 in a setup program 101a stored in a BIOS ROM of the computer. The other password (hereinafter referred to as a master key password) is set by a person other than an end user by using a specific application program AP, which is not stored in the computer. This application program AP, for example, is recorded in a floppy disk, and then the floppy disk is mounted in a floppy disk apparatus packed inside the computer. The application program AP is loaded in a system memory so that the application program AP starts. Moreover, in this embodiment, the application program for setting a master key password includes a routine for converting a password into a compressed bit row.

The structure of the setup program 101a is not described since the structure is the same as that shown in FIG. 2. The structure of a system activation program 101b is the same of that shown in FIG. 2 except for the content of a comparison module 131c in a password processing module 131.

The comparison module 131c of this computer compares an inputted password with either one of a user password or a master key password stored in the password area 102a of the backup RAM 102. If the inputted password coincides with the user password or master key password, it is judged that there is a coincidence.

Next, an operation of this computer will be described. The description concerning conversion of a password into a compressed bit row is omitted.

A master key password is set and managed by the specific application program AP in a manufacturing factory, a selling store and the like before the computer is delivered to an end user.

After a master key password is set, the computer is delivered to an end user. An operation, where the end user sets a user password upon receipt of the computer, is similar to the previous embodiment.

Figure 6:
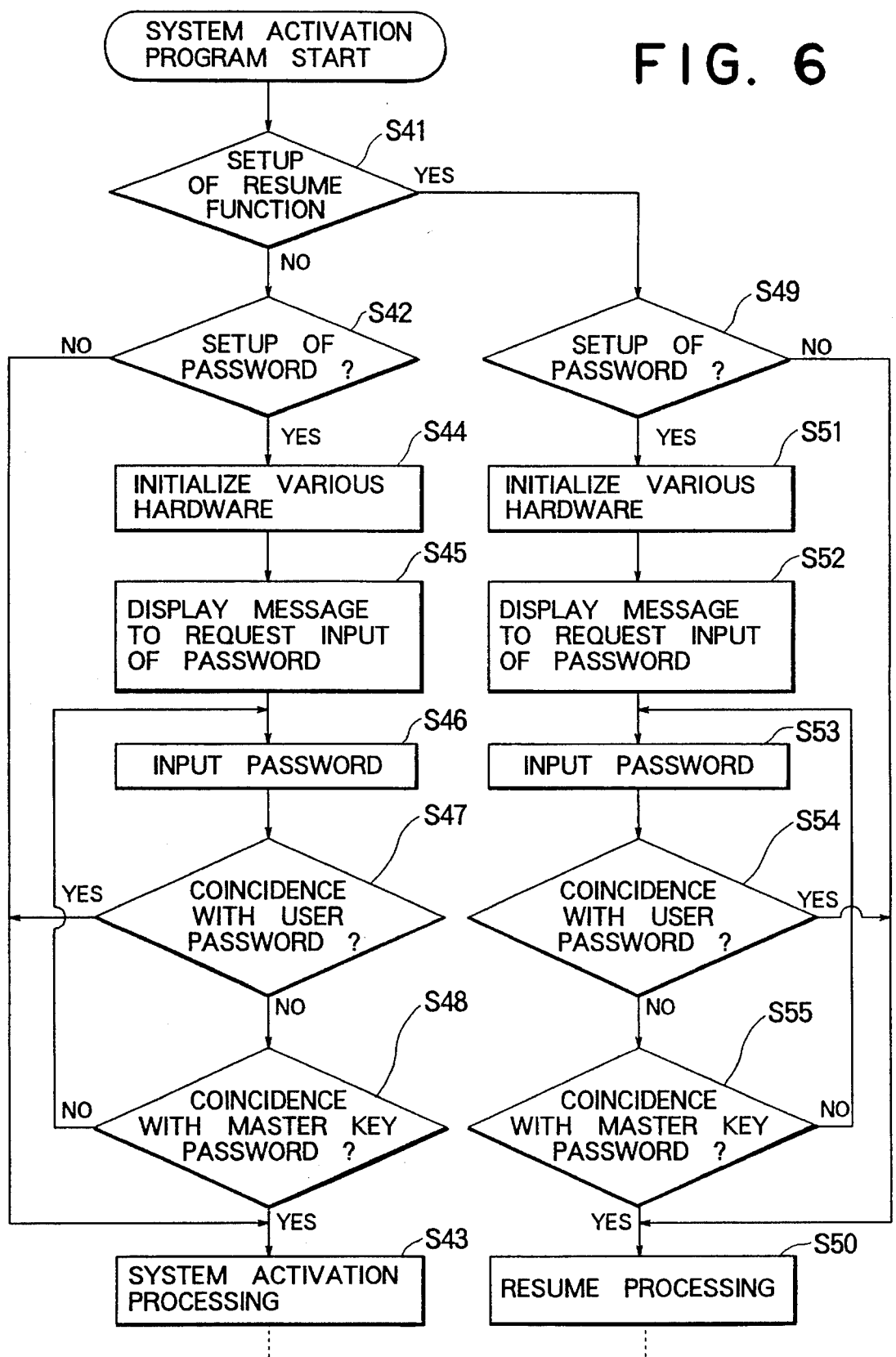
FIG. 6 is a flow chart showing operations at system activation of the computer shown in FIG. 5.

Referring to FIG. 6, an operation for activating the computer will be described.

If the main power is turned on, a flag check module 133a in the system activation program 101b is activated. A CPU 4 checks a resume flag held in a resume flag area 102b of the backup RAM 102 to judge whether or not the resume function is enabled at present (step S41).

If the check of the resume flag is completed, the password processing module 131 is activated. The CPU checks a password flag stored in the password area 102a of the backup RAM 102 in accordance with the flag check module 131a in the password processing module 131 to judge whether or not a password is set (steps S42, S49).

If while the resume function is not set, it is detected that a password is not set, the CPU activates the system to an access allowable state in accordance with a system activation module 132 (step S43). Thereafter, the flow advances to normal data processing.

If while the resume function is set, it is detected that a password is not set, the CPU activates a resume activation module 133b in a resume function module 133 to restore a state of data processing immediately before the main power is turned off (step S50). Thereafter, the flow advances to normal data processing.

If it is detected that a password is set in step S42 (step S49), the CPU initializes various hardware necessary for password processing (steps S44, S51). Thereafter, a message requesting a user to input a password is displayed on a display (steps S45, S52).

In response to this message, the user inputs a password from a keyboard. If a password is inputted (steps S46, S53), the CPU reads a user password and a master key password stored in the password area 102a of the backup RAM 102 in accordance with the comparison module 131c to firstly compare the inputted password with the user password (steps S47, S54).

As a result of the comparison, if a coincidence is found between the inputted and user passwords, the flow advances to step S43 (step S50) to execute the system activation processing or resume processing.

If a coincidence is not found between the inputted and user passwords, the CPU 4 compares the inputted password with the master key password (steps S43, S55).

As a result of the comparison, if a coincidence is found between the inputted and master key passwords, the flow advances to step 43 (step 50) to execute the system activation processing or resume processing.

Further, if a coincidence is not found between the inputted and master key passwords, the CPU judges that the inputted password is invalid. The flow returns to the state prior to step S46 (step S53).

Thus, in this computer, if an end user-forgets a password registered by himself, he contacts a person who sets (manages) a master key password and is informed of the master key password so that the system can be activated.

In addition, in this computer, if the computer must be urgently used while the user is absent, the system can be activated by the similar method.

In the case where many computers are purchased, the representative of the purchaser may set and manage a master key password of each computer.

As a further embodiment of this invention, there is a method where a user registers two or more kinds of passwords (user passwords) in the backup RAM, and if an inputted password coincides with one of them when collating the passwords, it is judged that there is a coincidence.

Moreover, in order to prevent illegal use of the computer, there may be added a function where if failure of password collation is successively repeated at a predetermined times, an operation of the whole computer is forcibly stopped for a certain period.

What is claimed is:

1. A computer with a password processing function, comprising:

input means for inputting a first password and a second password;

first conversion means for converting the first password inputted from the input means into a first compressed bit row in accordance with a predetermined rule;

storage means for storing the first compressed bit row converted by the first conversion means;

second conversion means for converting the second password inputted from the input means into a second compressed bit row in accordance with the same predetermined rule of the first conversion means;

comparison means for comparing the second compressed bit row converted by the second conversion means with the first compressed bit row stored in the storage means; and setting means for, when as a result of the comparison by the comparison means the second compressed bit row coincides with the first compressed bit row, setting the computer to an access allowable state.

2. The computer of claim 1, wherein the first conversion means and the second conversion means convert the first password and the second password into the first and second compressed bit rows of a fixed length, respectively.

3. The computer of claim 1, wherein the first conversion means and the second conversion means divide binary number bit rows corresponding to the first password and the second password by a polynomial, to obtain quotients thereof as a conversion result, respectively.

4. The computer of claim 1, wherein the first conversion means and the second conversion means add all codes of each letter of the first password and the second password, to obtain sums thereof as a conversion result, respectively.

5. A computer with a password processing function, comprising:

input means for inputting a first password, a second password and a third password;

means for incorporating an application program stored in an outer storage means outside the computer for registering the first password into the computer:

first registration means for registering the first password inputted from the input means as a first registration password in accordance with the incorporated application program;

second registration means for registering the second password inputted from the input means as a second registration password in accordance with a program originally stored in the computer;

storage means for storing the registered first registration password and the registered second registration password;

comparison means for comparing the third password inputted from the input means with the first registration password and the second registration password stored in the storage means; and setting means for, when as a result of the comparison by the comparison means the third password coincides with one of the first registration password and the second registration password, setting the computer to an access allowable state.

6. A password processing method of a computer, comprising the steps of:

inputting a first password;

converting the inputted first password into a first compressed bit row in accordance with a predetermined rule;

storing the first compressed bit row converted from the first password;

inputting a second password;

converting the inputted second password into a second compressed bit row in accordance with the predetermined rule;

comparing the converted second compressed bit row with the stored first compressed bit row; and setting the computer to an access allowable state, when as a result of the comparison the second compressed bit row coincides with the first compressed bit row.

7. The method of claim 6, further comprising the steps of:

turning off a main power;

switching ON/OFF of setting a resume function wherein a data processing state immediately before the main power is turned off is saved, and the state is restored when the main power is turned on;

detecting the ON/OFF of setting the resume function; and activating the resume function to restore the data processing state immediately before the main power is turned off, when the ON of setting the resume function is detected, and as a result of the comparison the second compressed bit row coincides with the first compressed bit row.

8. A password processing method of a computer, comprising the steps of:

inputting a first password, a second password and a third password;

incorporating an application program stored in an outer storage means outside the computer for registering the first password into the computer;

registering the first password inputted from the input means as a first registration password in accordance with the incorporated application program;

registering the second password inputted from the input means as a second registration password in accordance with a program originally stored in the computer;

storing the registered first registration password and the registered second registration password;

comparing the third password inputted from the input means with the stored first registration password and the stored second registration password; and setting the computer to an access allowable state, when as a result of the comparison by the comparison means the third password coincides with one of the first registration password and the second registration password.

9. The method of claim 8, further comprising the steps of:

turning off a main power;

switching ON/OFF of setting a resume function wherein a data processing state immediately before the main power is turned off is saved, and the state is restored when the main power is turned on;

detecting the ON/OFF of setting the resume function; and activating the resume function to restore the data processing state immediately before the main power is turned off, when the ON of setting the resume function is detected, and as a result of the comparison the third password coincides with one of the first registration password and the second registration password.

10. A password processing method of a computer, comprising the steps of:

inputting a plurality of first group passwords;

converting the inputted plurality of first group passwords into a plurality of first group compressed bit rows in accordance with a predetermined rule, respectively;

storing the first group compressed bit rows converted from the plurality of first group passwords;

inputting a second password;

converting the inputted second password into a second compressed bit row in accordance with the predetermined rule;

comparing the converted second compressed bit row with the stored first group compressed bit rows; and setting the computer to an access allowable state, when as a result of the comparison the Second compressed bit row coincides with one of the first group compressed bit rows.

11. The method of claim 10, further comprising the steps of:

turning off a main power;

switching ON/OFF of setting a resume function wherein a data processing state immediately before the main power is turned off is saved, and the state is restored when the main power is turned on;

detecting the ON/OFF of setting the resume function; and activating the resume function to restore the data processing state immediately before the main power is turned off, when the ON of setting the resume function is detected, and as a result of the comparison the second compressed bit row coincides with one of the first group compressed bit rows.

12. A password processing method of a computer, comprising the steps of:

inputting a first password, a second password and a third password;

incorporating an application program stored in an outer storage means outside the computer for registering a first password, the program including a routine for converting the first password into a first compressed bit row in accordance with a predetermined rule;

converting the first password inputted from the input means into the first compressed bit rowing accordance with an incorporated application program;

registering the first compressed bit row as a first registration password;

converting the second password inputted from the input means into the second compressed bit row in accordance with a program originally stored in the computer;

registering the second compressed bit row as a second registration password;

storing the first compressed bit row and the second compressed bit row;

converting the third password inputted from the input means into a third compressed bit row in accordance with the program originally stored in the computer:

comparing the third compressed bit row with the stored first and second compressed bit rows; and setting the computer to an access allowable state, when as a result of the comparison the third compressed bit row coincides with one of the first and second compressed bit rows.

13. The method of claim 12, further comprising the steps of:

turning off a main power;

switching ON/OFF of setting a resume function wherein a data processing state immediately before the main power is turned off is saved, and the state is restored when the main power is turned on;

detecting the ON/OFF of setting the resume function; and activating the resume function to restore the data processing state immediately before the main power is turned off, when the ON of setting the resume function is detected, and as a result of the comparison the third compressed bit row coincides with one of the first and second compressed bit rows.

14. A computer system, comprising:

removable data storage means for storing a password application program having a master password data, the removable data storage means being removably connected to a computer;

memory means for storing the master password data;

loading means for loading the master password data from the removable data storage moans into the memory means;

data input means for inputting a first password data;

comparison means for comparing the master password data and the first password data; and setting means for setting the computer to an access allowable state when the comparison means detects a coincidence of the master password data and the first password data.

15. A computer system according to claim 14, wherein the memory means further stores a second password data inputted by the input means before the computer system is powered off and a third password data inputted by the input means after the computer is powered on, the comparison means compares the second password data and the third password data, and the setting means sets the computer to the access allowable state when the comparison means detects a coincidence of the second password data and the third password data.

16. A computer system according to claim 14, wherein the removable data storage means is a floppy disk.

* * * * *